(12) United States Patent
Jakubowski, Jr. et al.

(10) Patent No.: US 7,147,188 B2
(45) Date of Patent: Dec. 12, 2006

(54) AIRCRAFT STORE EJECTOR RACK SYSTEMS AND METHODS

(75) Inventors: Thaddeus M. Jakubowski, Jr., St. Charles, MO (US); John K. Foster, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 25 days.

(21) Appl. No.: 10/926,630

(22) Filed: Aug. 26, 2004

(65) Prior Publication Data

US 2006/0060714 A1 Mar. 23, 2006

(51) Int. Cl.
*B64D 1/12* (2006.01)

(52) U.S. Cl. .................................... 244/137.4

(58) Field of Classification Search ............. 244/137.4; 89/1.51, 1.54, 1.59; 91/468, 442, 441
See application file for complete search history.

(56) References Cited

U.S. PATENT DOCUMENTS

| | | | |
|---|---|---|---|
| 2,993,505 A * | 7/1961 | Hathorn et al. ............. | 137/492 |
| 4,552,327 A * | 11/1985 | Carter ...................... | 244/137.4 |
| 5,583,312 A | 12/1996 | Jakubowski, Jr. | |
| 5,857,647 A * | 1/1999 | Jakubowski, Jr. ........ | 244/137.4 |
| 6,009,788 A | 1/2000 | Jakubowski, Jr. | |
| 6,035,759 A | 3/2000 | Jakubowski, Jr. | |
| 6,347,768 B1 | 2/2002 | Jakubowski, Jr. | |
| 6,811,123 B1 * | 11/2004 | Foster et al. ............. | 244/137.4 |

* cited by examiner

*Primary Examiner*—Tien Din
(74) *Attorney, Agent, or Firm*—Lee & Hayes, PLLC

(57) ABSTRACT

Store ejector rack systems and methods having an improved fluid actuator assembly for sequencing the opening of the hooks from which the store is suspended and the pressurization of thrusters which force the store away from the aircraft are disclosed. In one embodiment, an actuator assembly includes a staged valve assembly including a primary valve for controlling the flow of high pressure fluid from an accumulator to the thrusters, and a slave piston independently movable with respect to the primary valve for actuating the hook release mechanism.

7 Claims, 8 Drawing Sheets

AIRCRAFT STORE EJECTOR RACK SYSTEMS AND METHODS

FIELD OF THE INVENTION

This invention generally relates to store ejector rack systems and methods for aircraft and, more particularly, to an improved fluid actuator for such racks.

BACKGROUND OF THE INVENTION

An aircraft ejector rack is a device used to carry and release stores such as bombs and missiles from an aircraft in flight. These racks are typically mounted to the undersurfaces of aircraft wings and fuselages and incorporate both release and ejection features. The release features normally include bails or hooks from which stores may be suspended, and the ejection features normally include pneumatically operated thrusters for forcibly ejecting stores away from the aircraft to minimize the possibility of their colliding with the aircraft after release.

A contemporary ejection rack system of the type described above incorporates an onboard pressurization capability, employing a single pressurization system capable of operating multiple release mechanisms and uses air to operate both the store release bails and thrusters. The system also includes a miniature compressor and a gas purification system which filters, dries, and stores ambient air as an energy medium. With the onboard compressor, pressure in the system can be maintained at the desired operating level regardless of system usage or temperature changes in the gas. The use of air eliminates the problems associated with the use of pyrotechnics to generate high pressure gasses, such as periodic cleaning required by the corrosives and moisture generated in such systems, and also eliminates the sealing problems commonly found in hydraulically operated ejector racks. An example of such a state-of-the-art pneumatically operated ejector rack system is seen in U.S. Pat. No. 5,583,312, which is incorporated herein by reference.

It is common in the above-described prior art ejector rack systems to release a store by simultaneously pressurizing the hook release mechanism and the thrusters. The problem with such simultaneous pressurization is that it results in significant forces being applied to the store before the hook is fully opened, resulting in the transfer of those forces to the release mechanism. If those forces are sufficiently high, the release mechanism may jam or stall and the store may not be released. Secondly, the force required to open the hook may result in the excessive consumption of energy in the gas so that insufficient energy is available to power the thruster. One solution to this problem is proposed in U.S. Pat. No. 6,347,768, incorporated herein by reference, which discloses a fluid actuator for ejector rack systems which stages or sequences the operation of the hook release mechanisms and the thrusters. FIG. 4 of that patent illustrates an actuator including a valve assembly which controls the flow of high pressure gas from an accumulator to the thrusters. The valve is also mechanically connected by a rod and a release ram to a hook release mechanism. The valve includes a cylindrical projection, referred to as a tab, which enters a bore in the valve seat when the valve is in its uppermost or closed position. Upon command, the valve moves downward, engaging the hook release mechanism when the valve is moved downward a predetermined distance. When the hook is fully opened, the tab on the valve head clears the valve seat, permitting high pressure air to pass to the thrusters. The problem encountered with this device is that because the tab is unsealed in the bore, it permits the leakage of high pressure air through the valve as soon as the primary valve is unseated which results in the loss of energy and the premature pressurization of the thruster.

Accordingly, there is an unmet need in the prior art to provide for an aircraft stores ejector rack having a fluid actuator which pressurizes the hook release mechanism prior to the pressurization of the thrusters, thus avoiding the loss of fluid energy and jamming of the hook release mechanism.

Moreover, there is a further unmet need in the prior art to provide for such a fluid actuator including a staged valve assembly connected to the hook release mechanism which permits passage of high pressure gas to the thruster only after the hook release mechanism has moved the hook to the open position.

SUMMARY OF THE INVENTION

This invention can be broadly summarized as providing for stores ejector rack systems and methods for an aircraft. In one embodiment a rack includes a jacket having upper, middle, and lower chambers, and a primary valve for controlling fluid flow between the upper and middle chambers. The valve assembly also includes a slave piston which is movable independently of the primary valve in response to the pressure differential between the middle and lower chambers.

In accordance with a more detailed aspect of the invention, the valve assembly includes a stem slidably mountable within the jacket and a primary valve slidably mountable on the stem. The valve assembly also includes a slave piston mounted to the stem for translation between upper and lower positions and engageable with a hook release mechanism. The valve assembly further includes a spring for biasing the valve toward its closed position, a second spring for biasing the slave piston towards its upper position, and a control valve for controlling fluid pressure in the lower chamber.

BRIEF DESCRIPTION OF THE DRAWINGS

Preferred and alternate embodiments of the present invention are described in detail below with reference to the following drawings.

DETAILED DESCRIPTION OF THE PREFERRED EMBODIMENT

The present invention generally relates to systems and methods for separating stores from an aircraft. Many specific details of certain embodiments of the invention are set forth in the following description and FIGS. 1 through 8 provide a thorough understanding of such embodiments. One skilled in the art, however, will understand that the present invention may have additional embodiments or that the present invention may be practiced without several of the details described in the following invention.

Figure 1:
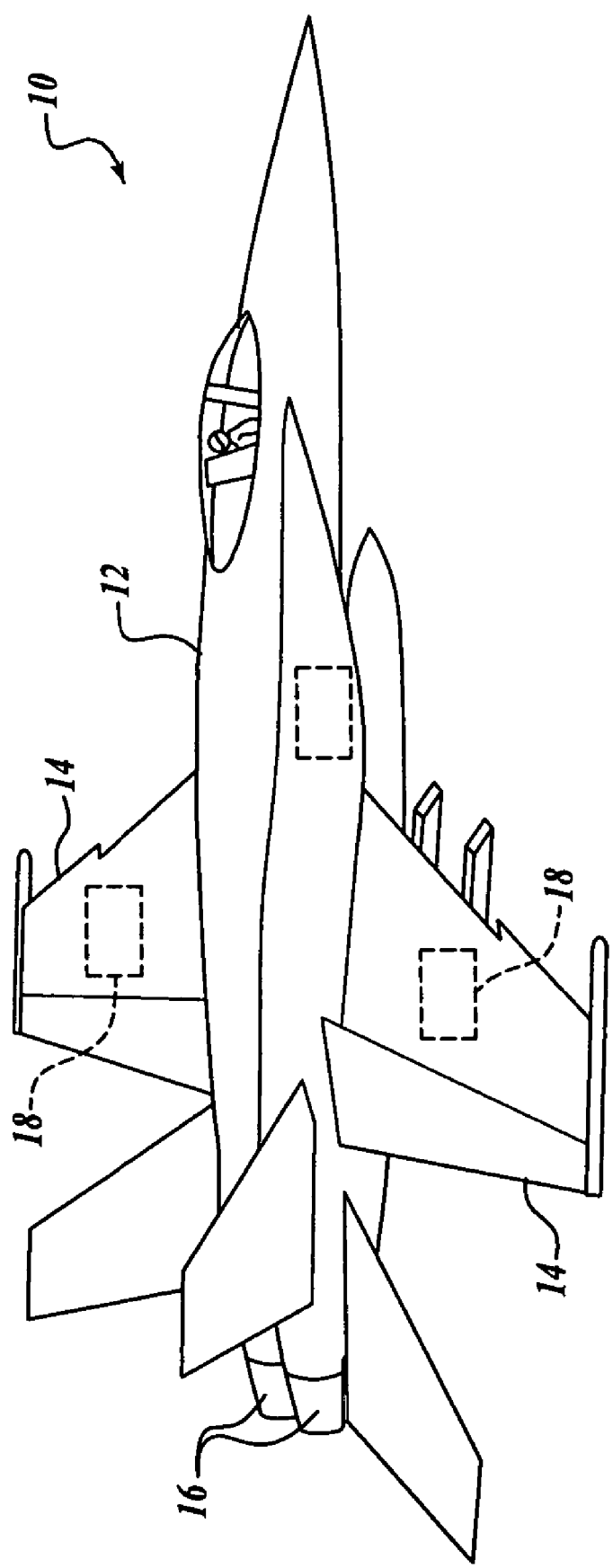
FIG. 1 is a side view of an aircraft in accordance with an embodiment of the invention.

It will be appreciated that embodiments of apparatus and methods in accordance with the present invention may be employed on a wide variety of aerospace vehicles. For example, FIG. 1 is a side view of an aircraft generally designated by the numeral 10 in accordance with an embodiment of the invention. In this embodiment, aircraft 10 includes a fuselage 12, a pair of wings 14, and at least one engine 16. Aircraft 10 further includes a pair of stores separation systems 18 in accordance with the present invention located on the lower surfaces of each of the wings 14. In one particular embodiment, each of the systems 18 is of the type described above and shown in FIGS. 2–8. It will be appreciated that a variety of alternate embodiments of stores separation systems in accordance with the invention may be conceived. For example, a stores separation system in accordance with the present invention may be operatively coupled to the fuselage 12 rather than to the wings 14 (e.g. to eject a bomb, missile, drop tank, payload, etc), or to any other suitable portion of the aircraft 10.

Furthermore, although aircraft 10 shown in FIG. 1 is representative of a well-known fighter aircraft, specifically, an F/A-18E Super Hornet manufactured by The Boeing Company, in alternate embodiments, virtually any other type or variety of military aircraft may be conceived that include apparatus and methods in accordance with the present invention. In alternate embodiments, for example, the aircraft may be a fighter aircraft, a rotary aircraft, a bomber aircraft, or any other suitable type of manned or unmanned aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference.

Figure 2:
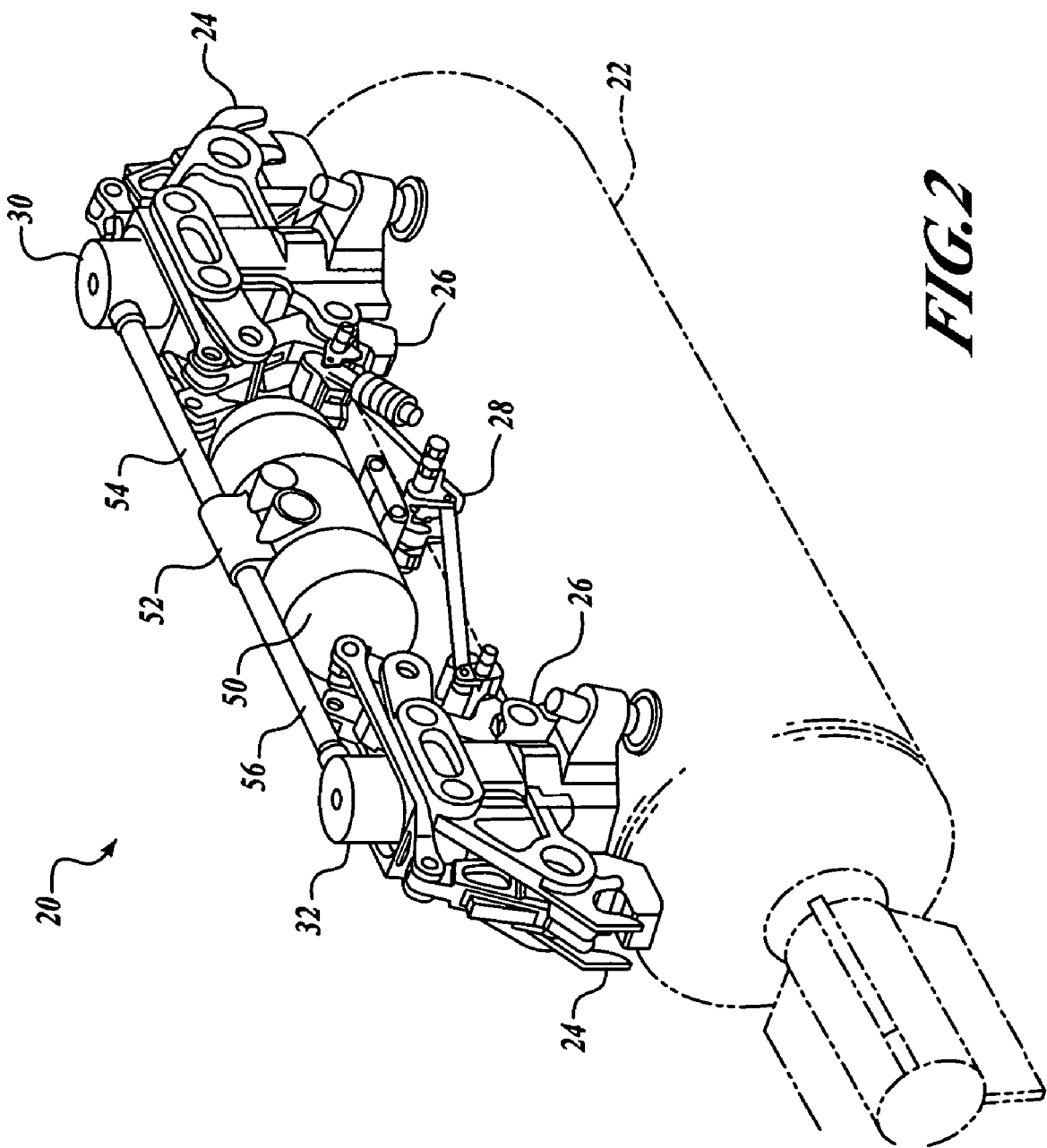
FIG. 2 is a perspective view of an injector rack constructed in accordance with an embodiment of the invention.

In FIG. 2 illustrates a pneumatic ejector rack assembly 20 for forcibly ejecting a store from an aircraft in accordance with an embodiment of the present invention. Store 22 is suspended from the ejector rack assembly by carrier 24 which includes hooks 26 and hook actuating mechanisms 28. The rack assembly also includes pneumatically actuated thrusters 30 and 32 which include rams 34 and 36 (not shown), each of which is disposed for reciprocating motion within its respective thruster. The purpose of the thruster is to forcibly eject store 22 downward and away from the aircraft after release of the store by carrier 24 to minimize the possibility of the store striking the aircraft after release. FIG. 2 shows the rams in their fully retracted position and with hooks 26 in engagement with carrier 24.

Both the thrusters and the release mechanism are actuated by compressed air from a remotely located onboard pressurization unit (not shown) which supplies drive filtered and pressurized air to accumulator 50. The accumulator 50 is in fluid communication with thrusters 30 and 32 by means of manifold 52 and feed conduits 54 and 56, respectively. Upon command, high pressure air is provided for the accumulator 50 by means of a fluid actuator located within the accumulator 50 to activate hook release mechanism 28 and opening hooks 26 thereby releasing store 22. High pressure air is also directed by the fluid actuator to thrusters 30 and 32 driving rams 34 and 36 downward and forcibly ejecting store 22 away from the aircraft. Store ejector racks of the type generally described above are known in the prior art as shown by U.S. Pat. Nos. 6,035,759 and 6,009,788 each of which is incorporated herein by reference.

Figure 3:
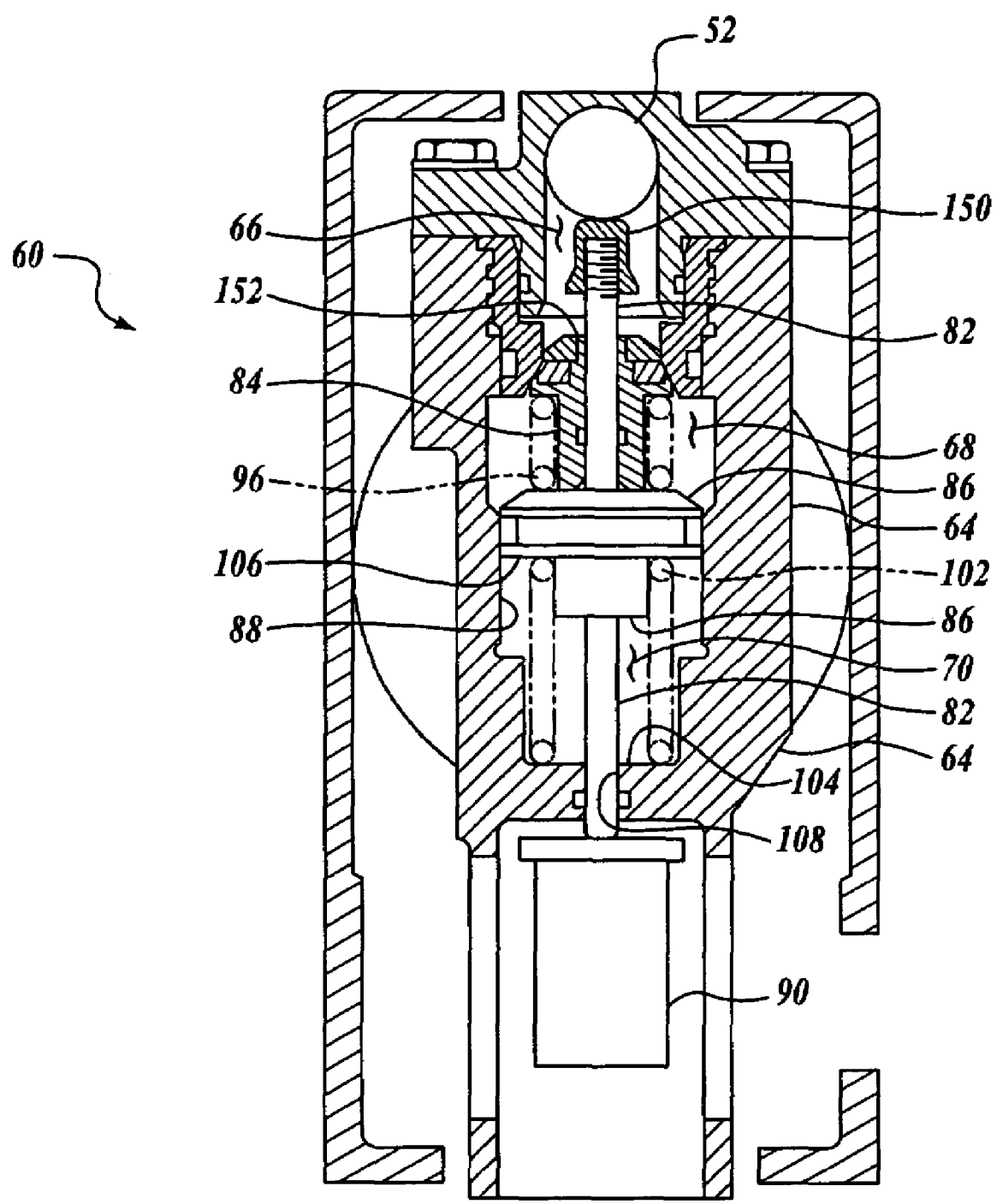
FIG. 3 is a schematic side view of a fluid actuator assembly according to another embodiment of the present invention.
Figure 4:
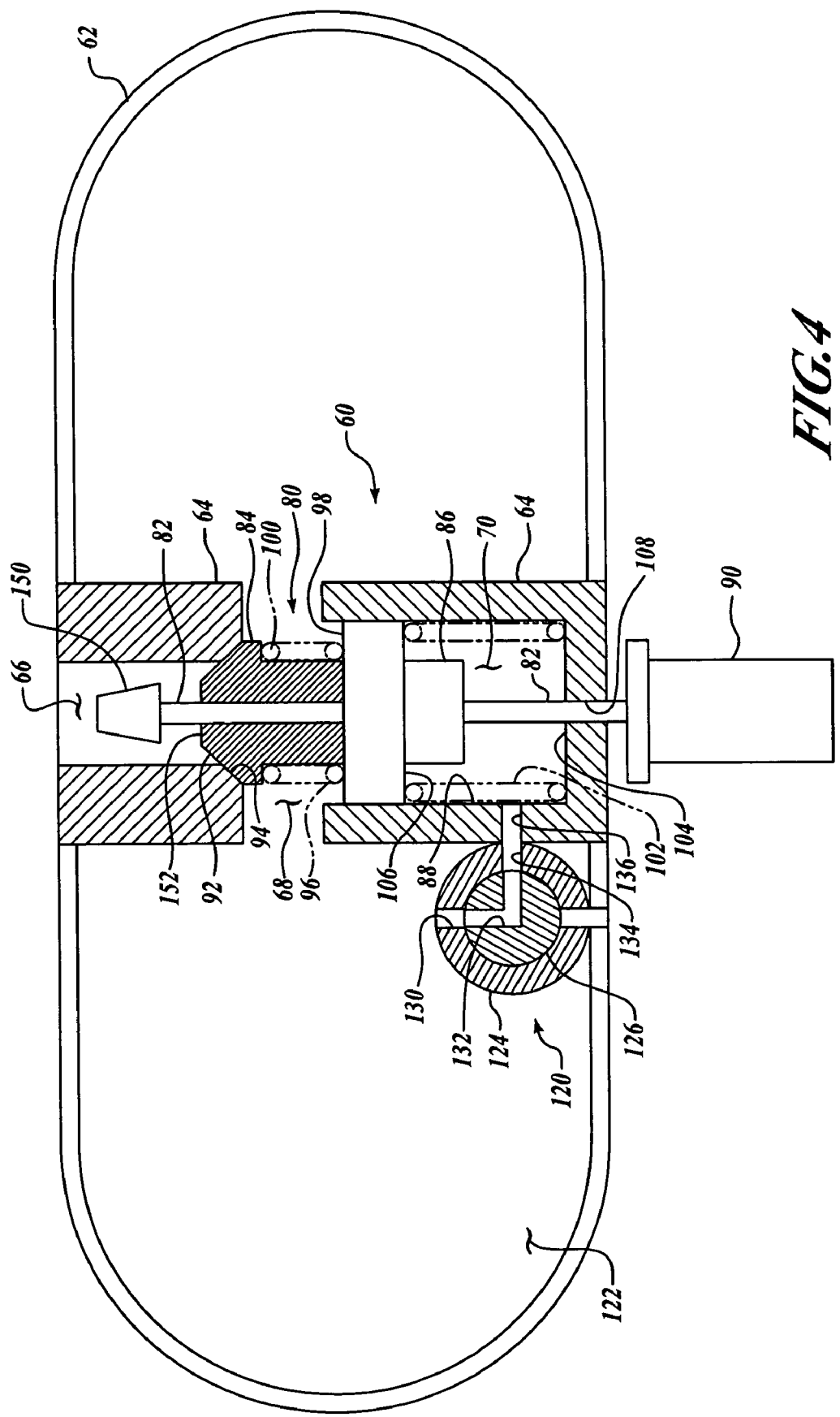
FIG. 4 is a schematic front view of the actuator assembly of FIG. 3.

FIGS. 3 and 4 schematically illustrate an improved fluid actuator assembly 60 which provides for sequential pressurization of the hook release mechanisms and the thrusters to alleviate the problems encountered with simultaneous pressurization of those devices as described above. Actuator assembly 60 is largely disposed within accumulator 62 which is similar in construction to accumulator 50 referred to above except for important, inventive aspects described below. The actuator assembly 60 includes jacket 64 which defines upper chamber 66, middle chamber 68, and lower chamber 70. The jacket 64 houses a valve assembly 80 which includes stem 82, primary valve 84 which is slidably mounted on the stem, and slave piston 86 which is affixed to the stem and mounted for reciprocation within bore 88 of the jacket. Stem 82 is also sealably mounted for reciprocation in bore 108 formed in the jacket. Also affixed to the stem is hook release piston 90 which is operably engaged to a hook release mechanism which is not shown, but which is well described in the incorporated patents. In FIGS. 3 and 4, primary valve 84 is shown in the closed position where frusto-conical surface 92 of the valve sealably engages mating seat 94 formed in the jacket. Coil spring 96, which extends between upper surface 98 of the slave piston and ledge 100 of the valve, biases the primary valve upward into the closed position. Likewise, coil spring 102, which extends between base 104 of bore 88 and under surface 106 of the slave piston, biases the slave piston upward into an upper position as shown in FIG. 4.

Actuator assembly 60 also includes control valve 120 which operates on command to open and close primary valve 84. It does so by providing communication between lower chamber 70 and either the interior 122 of accumulator 62 or a source of fluid pressure, typically ambient pressure, which is lower than the pressure of fluid within accumulator 62. The control valve includes body 124 and shaft 126 which is mounted for rotation within the valve body. In the operational position shown in FIG. 4, the control valve provides communication between the accumulator and lower chamber 70 via a first passage 130 in the valve body 124, a second passage 132 in the valve shaft 126, a third passage 134 in the valve body 124, a fourth passage 136 in the jacket 64. In that position, the pressure in lower chamber 70 is equal to the pressure of the fluid within accumulator 62. Because middle chamber 68 is also in communication with interior 122 of the accumulator, the pressure of both sides of slave piston 86 is equal, so it is forced upward by spring 102 until primary valve 84 which rests atop the slave piston and engages seat 94. When seated, primary valve 84 prevents high pressure fluid from entering upper chamber 66 which is in fluid communication with thrusters 30 and 32. Details of the operation and construction of the control valve are well described in U.S. Pat. No. 6,347,768 which is incorporated herein by reference.

Figure 5:
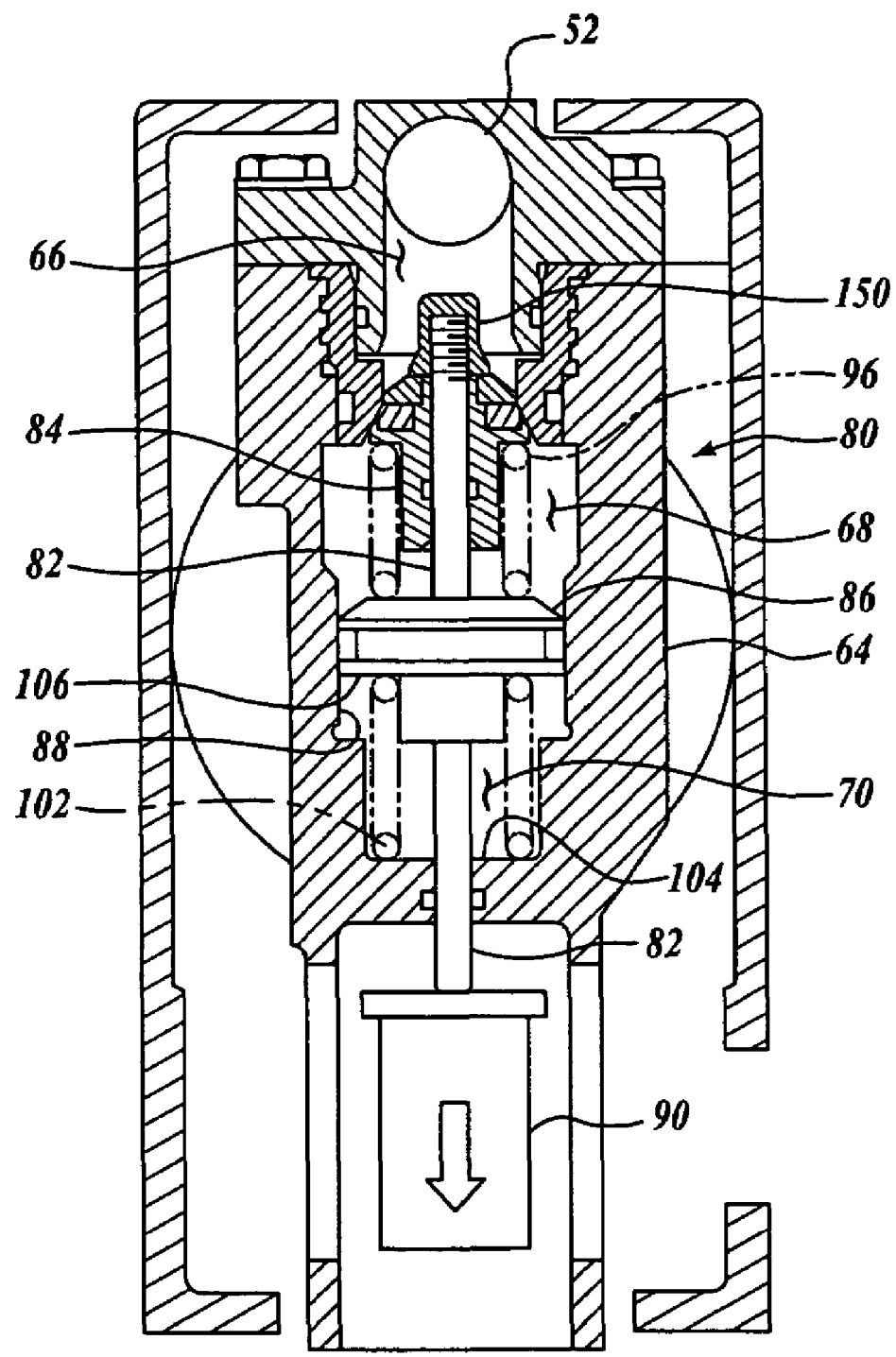
FIG. 5 is a second schematic side view of the actuator assembly of FIG. 3.
Figure 6:
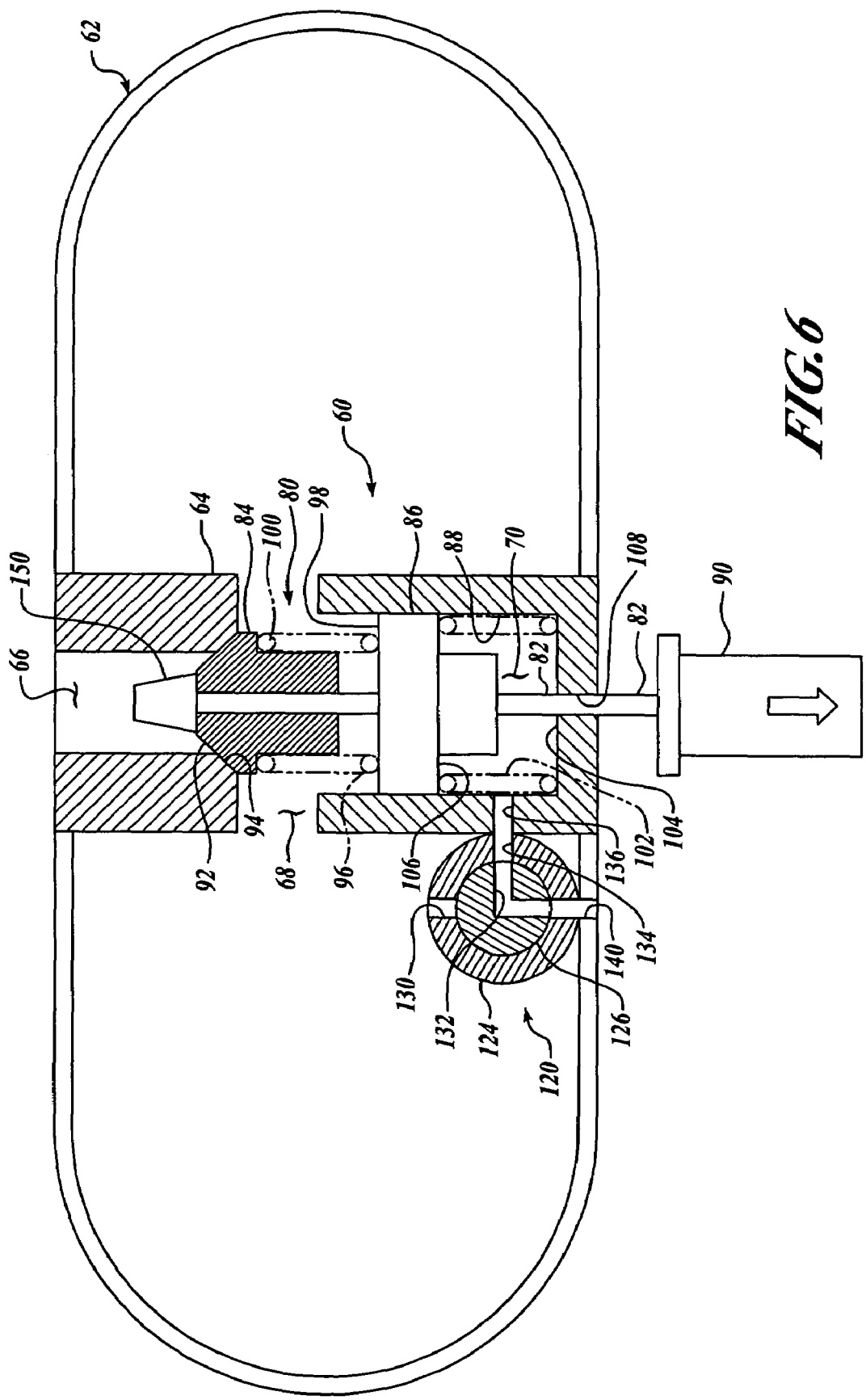
FIG. 6 is a schematic front view of the actuator assembly of FIG. 5.

When the command is given to eject store 22, control valve 120 is activated, causing valve shaft 126 to be rotated into the position shown in FIG. 6. In that position lower chamber 70 is placed in fluid communication with a source of lower pressure, typically the atmosphere, via the passages 132, 134, 136, and a fifth passage 140 in the valve body 124 and the accumulator 62. When so positioned, the control valve 120 causes the pressurized fluid in lower chamber 70 to be vented to the atmosphere. As the pressure in lower chamber falls, slave piston 86 is exposed to an increasing pressure differential between the upper and middle chambers, causing it to move downward in bore 88, as shown in FIGS. 5 and 6. As it does so, stem 82 and release piston 90 which are affixed to the slave piston also move downward, engaging and actuating the hook release mechanism (not shown). As the stem continues downward, retainer 150, which is affixed to the stem, contacts upper surface 152 of valve 84. At that point, hook release piston 90 has moved downward sufficiently that hooks 26 have fully opened and have released the store.

Figure 7:
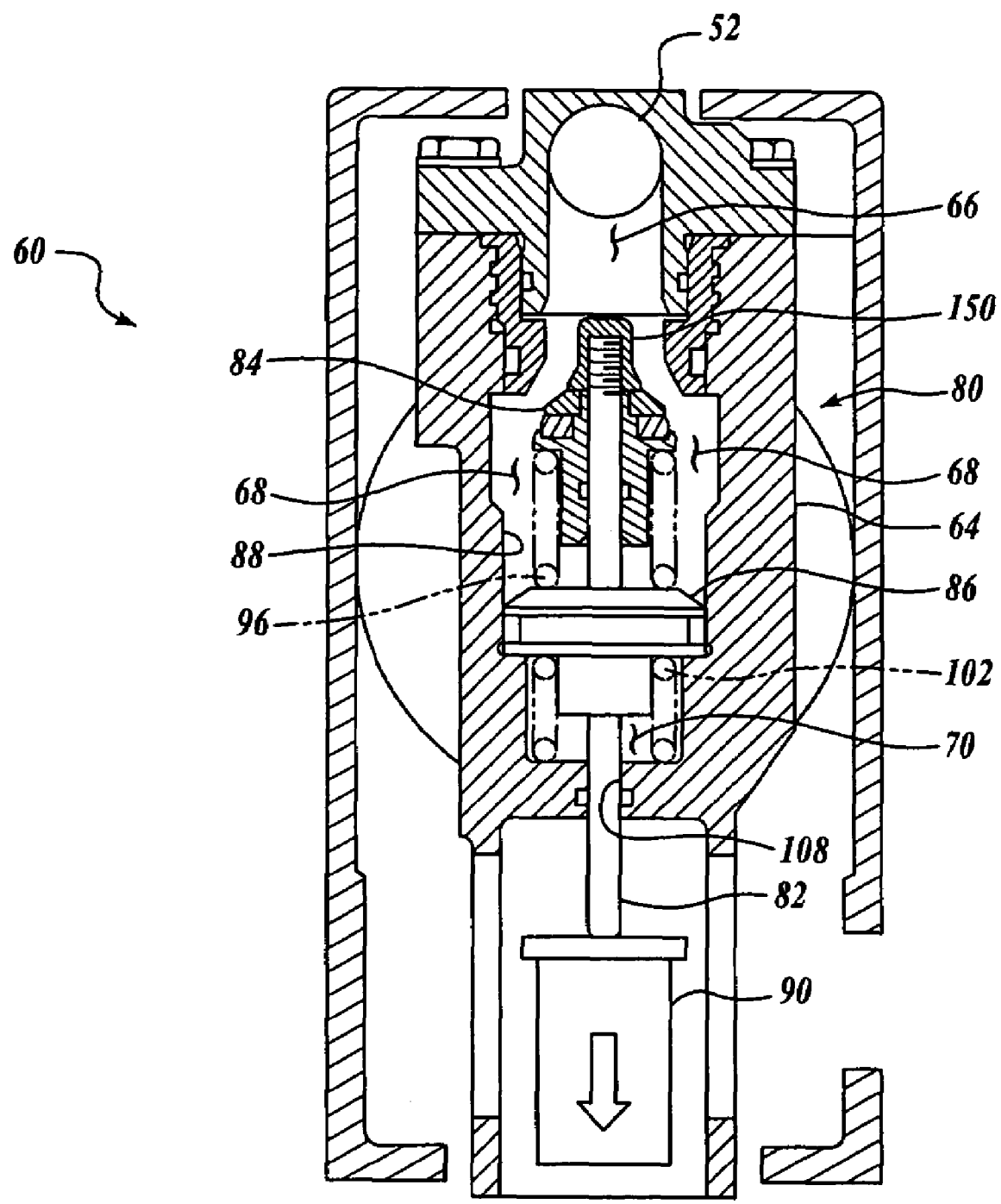
FIG. 7 is a third schematic side view of the actuator assembly.
Figure 8:
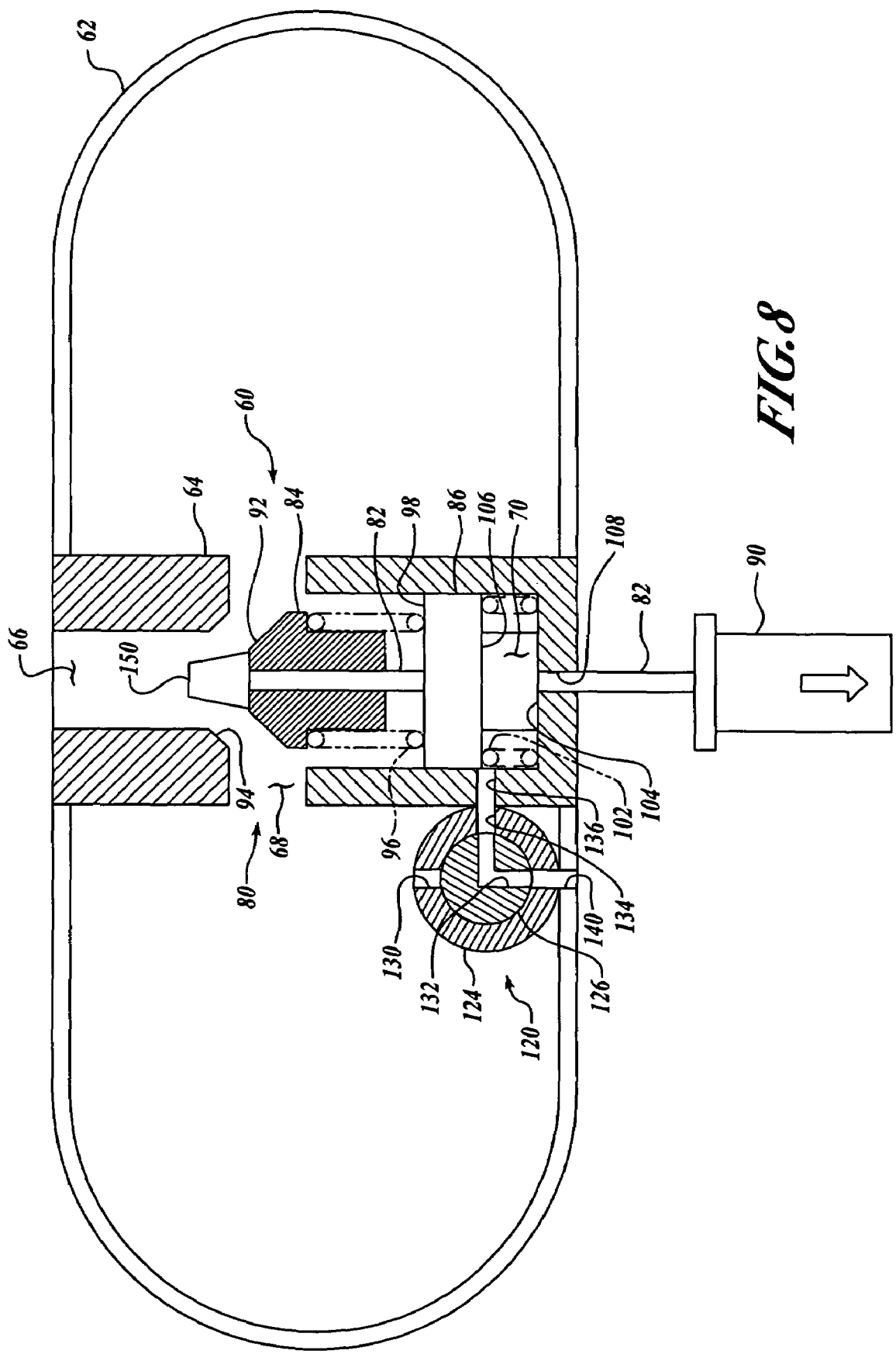
FIG. 8 is a schematic front view of the actuator assembly of FIG. 7.

Referring now to FIGS. 7 and 8, as stem 82 and slave piston 86 continue to move downward, primary valve 84 is forced further downward by retainer 150, causing the valve to unseat and open. As it does so, high pressure fluid from accumulator 62 is permitted to flow into upper chamber 66 which is in fluid communication with thrusters 30 and 32 by means of feed conduits 54 and 56, respectively. As they are pressurized, rams 34 and 36 are driven downward, ejecting the store from the aircraft. As the store is ejected, primary valve 84 and slave piston 86 will continue to move downward until they reach the positions shown in FIG. 8 where primary valve 84 is fully opened and the slave piston 86 is in its lower most position. The cycle is completed by returning the valve shaft to the position shown in FIG. 4, thus equalizing the pressure between middle chamber 68 and lower chamber 70. At that point, spring 102 forces slave piston 86 and valve 84 upward until the valve is closed.

Embodiments of systems and methods in accordance with the present invention may provide significant advantages over the prior art. For example, because the thrusters are not pressurized until hooks 26 are fully opened, any potential jamming or binding of the hook release mechanisms is avoided. Also, because the fluid actuator pressurizes the hook release mechanism prior to the pressurization of the thrusters, the loss of fluid energy associated with the prior art is reduced or eliminated.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

We claim:

1. A vehicle comprising:
    a body portion;
    one or more lifting surfaces operatively coupled to the body portion;
    at least one engine operatively coupled to the body portion; and
    a store separation system operatively coupled to at least one of the lifting surfaces and the body portion, the store separation system including:
        a store ejector rack having at least one thruster adapted to engage a store; and
        an actuator assembly operatively coupled to the at least one thruster, the actuator assembly comprising:
            a jacket defining upper, middle and lower chambers;
            a staged valve assembly disposed within the jacket, the assembly including:
                a primary valve for controlling the flow of fluid between the upper and middle chambers, the secondary primary valve having open and closed positions, and
                a slave piston independently movable with respect to the primary valve between upper and lower positions and responsive to a pressure differential between the middle and lower chambers.

2. The vehicle of claim 1, wherein the actuator assembly further includes a fluid accumulator for storing pressurized fluid, wherein the accumulator is in communication with the middle chamber.

3. The vehicle of claim 1, wherein the primary valve and the slave piston are disposed for independent translation within the jacket.

4. The vehicle of claim 1, wherein the actuator assembly includes a stem slidably mounted within the jacket.

5. A vehicle comprising:
    a body portion;
    one or more lifting surfaces operatively coupled to the body portion;
    at least one engine operatively coupled to the body portion; and
    a store separation system operatively coupled to at least one of the lifting surfaces and the body portion, the store separation system including:
        a store ejector rack having at least one thruster adapted to engage a store; and
        an actuator assembly operatively coupled to the at least one thruster, the actuator assembly comprising:
            a jacket defining upper, middle and lower chambers;
            a staged valve assembly disposed within the jacket, the assembly including:
                a primary valve for controlling the flow of fluid between the upper and middle chambers, the primary valve having open and closed positions, and
                a slave piston independently movable with respect to the primary valve between upper and lower positions and responsive to a pressure differential between the middle and lower chambers, wherein the actuator assembly includes a stem slidably mounted within the jacket;
    wherein the primary valve is slidably mounted on the stem for translation within the jacket.

6. A vehicle comprising:
    a body portion;
    one or more lifting surfaces operatively coupled to the body portion;
    at least one engine operatively coupled to the body portion; and
    a store separation system operatively coupled to at least one of the lifting surfaces and the body portion, the store separation system including:
        a store ejector rack having at least one thruster adapted to engage a store; and
        an actuator assembly operatively coupled to the at least one thruster, the actuator assembly comprising:
            a jacket defining upper, middle and lower chambers;
            a staged valve assembly disposed within the jacket, the assembly including:
                a primary valve for controlling the flow of fluid between the upper and middle chambers, the primary valve having open and closed positions, and
                a slave piston independently movable with respect to the primary valve between upper and lower positions and responsive to a pressure differential between the middle and lower chambers, wherein the actuator assembly includes a stem slidably mounted within the jacket;

wherein the actuator assembly further includes a control valve for varying fluid pressure in the lower chambers.

7. A vehicle comprising:
 a body portion;
 one or more lifting surfaces operatively coupled to the body portion;
 at least one engine operatively coupled to the body portion; and
  a store separation system operatively coupled to at least one of the lifting surfaces and the body portion, the store separation system including:
   a store ejector rack having at least one thruster adapted to engage a store; and
   an actuator assembly operatively coupled to the at least one thruster, the actuator assembly comprising:
    a jacket defining upper, middle and lower chambers;
    a staged valve assembly disposed within the jacket, the assembly including;
    a primary valve for controlling the flow of fluid between the upper and middle chambers, the primary valve having open and closed positions, and
    a slave piston independently movable with respect to the primary valve between upper and lower positions and responsive to a pressure differential between the middle and lower chambers, wherein the actuator assembly includes a stem slidably mounted within the jacket;
 wherein the control valve selectively provides fluid communication between the lower chamber and at least one of the accumulator and a source of pressure lower than the pressurized gas in the accumulator.

* * * * *